United States Patent Office 3,496,133
Patented Feb. 17, 1970

3,496,133
PROCESS FOR PREPARING FILLED POLYMERIC STRUCTURES
Frank Edward Hoffman, Circleville, Ohio, assignor to E. I. du Pont de Nemours and Company, Wilmington, Del., a corporation of Delaware
No Drawing. Filed May 10, 1965, Ser. No. 454,681
Int. Cl. C08g 51/04
U.S. Cl. 260—40          2 Claims

ABSTRACT OF THE DISCLOSURE

Particulate material is uniformly incorporated in thermoplastic organic polymeric material susceptible to thermal and hydrolytic degradation, e.g., polyethylene terephthalate, by first dispersing in a relatively small amount of the polymeric material in flake form the desired amount of particulate filler while maintaining the temperature below the melting point of the polymer, and thereafter dispersing the resulting mixture of polymer flake and filler in an additional amount of said polymer in the molten state, and removing occluded gases during mixing while maintaining the temperature of the mixture above the melting point of the polymer.

---

This invention relates to the preparation of polymeric materials containing particulate fillers, and more particularly to a process for incorporating in thermoplastic organic polymeric materials subject to thermal and/or hydrolytic degradation particulate fillers to produce filled polymeric material having a high degree of uniformity of filler concentration.

Shaped articles of thermoplastic, organic polymeric materials having particulate fillers are adapted to many uses in which the filler level is not critical, but for some uses the concentration of filler is highly critical, which, coupled with difficulties in achieving the required degree of uniformity results in the exclusion of such filled articles from some uses to which they are well suited and the adoption of coated articles in their stead. One such use is that of polymeric films having fillers of inorganic particulate material as drafting film as a substitute for high quality papers; precision work and copying techniques necessitate extreme uniformity in opacity and surface roughness and, hence, criticality in the concentration of contained particulate filler material and uniformity of dispersion. Still another use where conventional processes for production of filled articles is in the production of delustered and opaque films for the photographic arts. Heretofore, efforts to achieve the desired degree and uniformity of dispersion in those thermoplastic organic polymeric materials subject to thermal and hydrolytic decomposition have resulted in excessive molecular degradation.

More specifically, deficiencies arise from the manner of introduction of the filler, which in part is dictated by the thermal and hydrolytic characteristics of the polymer. For example, one of the preferred polymers for the uses indicated is polyethylene terephthalate, which is characterized by a very high melt viscosity, in which uniform dispersion of solids is accomplished with great difficulty. Prolonging mixing operations to afford better dispersion, or increasing the temperature to reduce melt viscosity, simply causes excessive polymer degradation in which the molecular weight may be reduced below an acceptable level, or prohibitive discoloration of the film may occur. Additionally, moisture, carried in part by the filler particles, tends to cause serious hydrolytic degradation of the polymer at elevated temperatures. It has been the practice in order to avoid these undesirable effects, to add the filler at a stage before final polymerization occurs; for example, in production of polyethylene terephthalate the fillers are added immediately following formation of the prepolymer (the ester interchange step) and before polymerization. This is satisfactory for achieving uniform dispersion, but it can upset an otherwise precisely controlled chemical process, making it difficult to control the degree of polymerization. Further, the introduction of the filler in apparatus far back in the process stream increases the difficulty of purging of the system in a change from one type of product to another (e.g., filled to unfilled products, or change of filler or concentration).

As indicated previously, addition of the particulate material as such to the melt has not enabled the production of shaped articles with the desired uniformity of dispersion. Under some conditions the gross average level of filler may be good, but fine uniformity is almost impossible to achieve.

The salient object of the present invention, therefore, is to provide a method for the addition of particulate fillers to a polymeric film at optimum concentrations and with good dispersion without thermal or hydrolytic degradation of the polymer. This and related objects will more clearly appear from the description which follows:

These objects are satisfactorily realized by the process of this invention which, briefly stated, comprises in combination the sequential steps of (1) uniformly dispersing in the organic thermoplastic polymeric material in the form of discrete solid particles (flake), a predetermined amount of a particulate filler material (i.e., a solid inorganic or organic substance chemically inert with respect to the polymer and insoluble therein), while maintaining the polymeric material at a temperature below the melting point thereof; and (2) thereafter uniformly dispersing, i.e., mixing, the resulting mixture of discrete particles of polymeric material and particulate filler material in an additional amount of said polymer in the molten state in a mixing zone while (a) maintaining the mixture at an elevated temperature above the melting point of the polymer effective to prevent solidification of the molten polymer and to melt the polymer particles, and (b) continuously removing all volatile material from the mixing zone. The resulting mixture of polymer and filler may be cooled and stored for later conversion into shaped articles; or, preferably, it is directly extruded through appropriate extrusion devices to form films, filaments, fibers, or other shaped articles.

In a preferred embodiment of the invention the process is carried out in a conventional screw extruder adapted to mixing a viscous mix as well as to extrude the resulting mixture as a shaped structure. Such an apparatus is customarily provided with a plurality of inlet ports and at least one venting port, and is further characterized by twin screws which intermesh to advance the material supplied at the inlet ports, with screw sections of varying pitches, adapted to particular functions, arranged consecutively on each screw shaft. Compression or decompression of the material occurs with changes in the rate of advance of the material as a function of the screw pitch, which enables venting and addition ports to be provided in the barrel of the extruder surrounding the screws, without loss of material through such ports. In addition, the barrel surrounding the screws has means for controlling the temperature of the conveyed material, such as passageways for heating and cooling fluids. Particularly adapted to this invention, and representative of the apparatus just described, is a twin screw mixer-extruded Model 83 ZSK manufactured by Werner and Pfleiderer Machine Manufacturers, Stuttgart. Thermoplastic organic polymeric material which is subject to thermal degradation and to hydrolytic degradation at elevated temperatuses, e.g., polyethylene terephthalate, is continuously fed in flake form into the extruder through the first of the inlet ports. Next, the desired particulate filler material, e.g., finely divided silica, is continuously introduced into the advancing stream of polymer flake at a measured rate dependent upon the concentration of filler material desired in the extrudate. At a point thereafter, the polymer in molten state is continuously fed into the advancing stream of mixed polymer flake and particulate filler material, and after a relatively short period of mixing during which all volatile material and particularly moisture carried into the system with the polymer flake and filler material, is vented through a suitably located venting port to which a vacuum may be applied to facilitate continuous removal of any volatile material. Cooling fluid is circulated through that portion of the jacket preceding the point at which the molten polymer is fed to the apparatus, to insure that the polymer flake does not soften or melt while it is being mixed with filler material; and heating fluid is fed to the jacket surrounding that portion of the apparatus through which the molten polymer is carried whereby to insure that the molten polymer will not solidify in the apparatus and that the polymer flake will be converted to the molten state prior to extrusion.

This particular sequence of addition of components under the conditions specified, enables the production of filled polymeric material of highest uniformity, and with a minimum of degradation of the polymer. Direct addition of filler material, such as finely divided inorganic oxides, to the high viscosity liquid (molten) polymer to achieve a filled shaped article of high uniformity such as a film without molecular degradation is virtually impossible. The root of the difficulty is, in part, in the inability during normal mixing of the particulate filler to penetrate the mass of polymer streams, which have high internal pressures, e.g., are highly cohesive. Increasing mixing times or elevating polymer temperature to reduce viscosity of cohesive forces promotes degradation of the polymer. These and other effects are set forth in Canadian Patent 650,402. The present invention avoids these effects by introduction of the flake polymer to the mixer-extruder, at a temperature below the melting point of the polymer, followed by introduction of the inorganic particulate matter after the flake is engaged in the spirals in such a manner that the particulate matter is thoroughly dispersed about and, in effect, carried on the flake, followed by introduction of this dispersion into a stream of molten polymer. After addition of the dispersed particulate matter to the molten stream, which may be accompanied by the introduction of occluded gases, and after any reactions resulting from the addition of the solids, the stream is vented by passage adjacent a venting port to which a vacuum may be applied to withdraw any gaseous components.

For maximum dispersion and for minimum degradation of polymer, it is essential that the flake which may be purposely fabricated or may be compacted trim waste from regular production, enter the extruder at a temperature below its melting point. This minimizes degradation of the polymer, but more importantly it provides a solid matrix for the dispersion of particulate matter in the melt. The large cross section of the flake prevents the insoluble material from becoming relatively isolated in flow streams of the melt. Therefore, the turbulence it creates is essential to the present invention, therefore it is essential to maintain the flake in solid form until it is at least partially dispersed in the melt.

The ratio of flake to melt and pigment is not critical, so far as the present invention is concerned, however, the higher the percentage of the flake the better the dispersion.

The process of the present invention is particularly adapted to polyethylene terephthalate, but is also adapted to processing other extrudable polymers which are subject to hydrolytic or oxidative degradation in the melt, such as other aromatic and aliphatic linear polyesters, for example, polycarbonates, such as poly(4,4'-dioxydiphenyl-2,2-propane) and poly(dimethylene diphenylene carbonate), and polyethylene isophthalate, polyethylene 2,6-naphthalate, polyethylene sebacate, and blends of each as well as poly(1,4-cyclohexane dimethylene terephthalate). Furthermore, it is useful for polyamides such as polyhexamethylene adipamide polyhexamethylene sebacamide and polycaprolactam.

By use of the process of the present invention filled films, for example, having a wide range of filler concentrations, of particle size, and of composition, have been made, all with especially good uniformity, and with molecular weights (intrinsic viscosity) within desired limits. With regard to the control of molecular weight, the molecular weight of the condensation polymers, such as polyethylene terephthalate, may be increased by application of a vacuum to the venting port to remove ethylene glycol eliminated in the condensation reaction. Conditions of temperature and pressure employed for this latter function are those known to one skilled in the art for the operation of a conventional post finisher.

The present invention is further characterized by the following advantages:

(1) Short passage of pigmented material enables quick purge of apparatus.

(2) Carrier nature of polymer flakes permits a wide range of loadings with a minimum agglomeration.

(3) Residence time of insoluble filler material in the melt for good dispersion is minimized by use of flake carrier, reducing degradation.

(4) Scrap containing filler may be recycled, with proper adjustment for concentration, by direct feeding, avoiding the contamination of the entire system or a large part thereof.

(5) Power requirements are substantially reduced from those of other mixing methods by virtue of the short path of the viscous melt through mixing elements.

What is claimed is:

1. A process for uniformly incorporating particulate filler material in thermoplastic organic polymeric material susceptible to thermal and hydrolytic degradation which consists of, in combination, the sequential steps of (1) uniformly dispersing in thermoplastic organic polymeric material in the form of discrete solid particles a predetermined amount of a particulate filler material while maintaining the polymeric material at a temperature below the melting point thereof; and (2) thereafter uniformly dispersing the resulting mixture in an additional amount of said polymer in molten state in a mixing zone while (a) maintaining the mixture of molten polymer and particulate filler material at a temperature above the melting point of the polymer, and (b) removing volatile material from the mixing zone as it is evolved.

2. The process of claim 1 wherein the polymeric material is polyethylene telephthalate.

References Cited

UNITED STATES PATENTS

| 2,530,852 | 11/1950 | Bixby | 260—34.2 |
| 2,773,044 | 12/1956 | Vesce | 260—40 |
| 3,113,119 | 12/1963 | Forrester. | |
| 3,164,563 | 1/1965 | Maxwell et al. | |
| 3,334,058 | 8/1967 | Alm. | |

MORRIS LIEBMAN, Primary Examiner

UNITED STATES PATENT OFFICE
CERTIFICATE OF CORRECTION

Patent No. 3,496,133                        February 17, 1970

Frank Edward Hoffman

It is certified that error appears in the above identified patent and that said Letters Patent are hereby corrected as shown below:

Column 4, lines 50 and 51, cancel "while maintaining" and insert -- with cooling whereby to maintain --.

Signed and sealed this 6th day of October 1970.

(SEAL)
Attest:

Edward M. Fletcher, Jr.                      WILLIAM E. SCHUYLER, JR.
Attesting Officer                              Commissioner of Patents